March 2, 1948.    G. CARLSON    2,437,073
ELECTRIC CABLE CLAMP AND BOX
Filed May 21, 1946
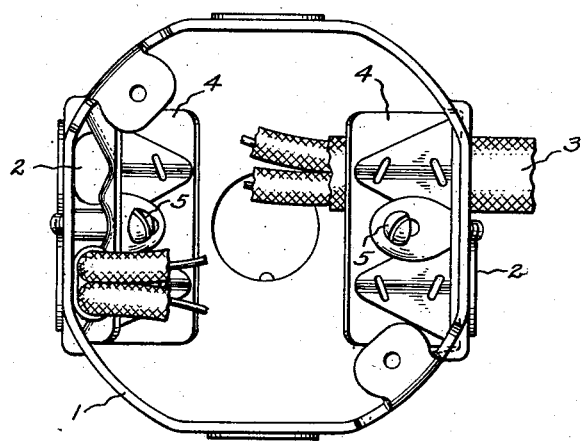
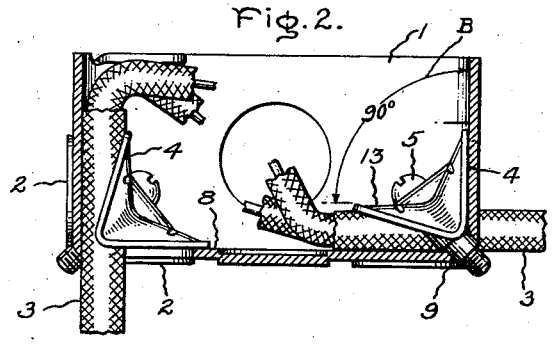
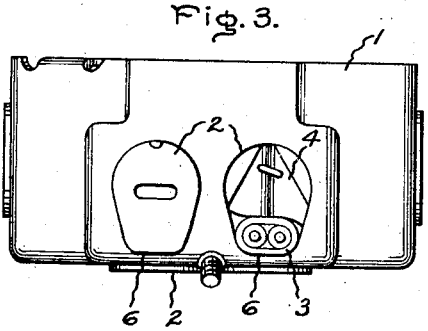
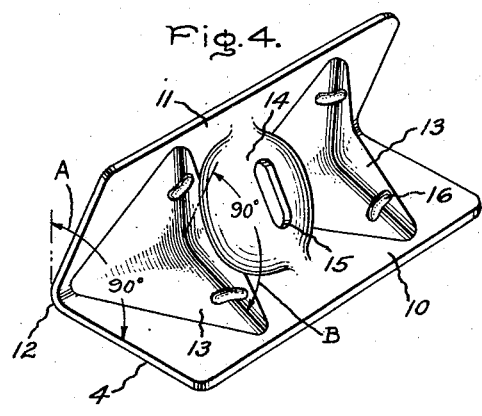
Inventor:
George Carlson,
by Alfred V. Bobst
His Attorney.

Patented Mar. 2, 1948

2,437,073

UNITED STATES PATENT OFFICE 2,437,073

ELECTRIC CABLE CLAMP AND BOX

George Carlson, Bridgeport, Conn., assignor to General Electric Company, a corporation of New York Application May 21, 1946, Serial No. 671,255

10 Claims. (Cl. 285—24.5)

My invention relates to an electric cable box and more particularly to a cable box for use with non-metallic sheathed cable of the type used in residence wiring systems.

Heretofore, cable boxes for armored cable, such as outlet boxes or switch boxes, have contained a single cable clamp, the box being constructed so that the armored cable may be inserted through knockout openings in either the side walls or the bottom of the box. Such knockout openings are customarily of substantially circular form so that after the knockout is removed a projecting wall is formed which engages the convolutions of the cable armor and cooperates with the clamp to lock the cable in position and prevent it from being pulled out of the box. In recent years, non-metallic sheathed cable has been used to a considerable extent as a substitute for armored cable, due principally to its lower cost. However, cable boxes for armored cable are not suitable for use with non-metallic sheathed cable due to the fact that the sharp edge of the box formed by removal of the knockout tends to cut into and damage the sheath of the cable.

To overcome this objection, cable boxes and clamps ordinarily used with armored cable were considerably modified for use in conjunction with non-metallic sheathed cable. In most instances, the modification consisted in providing a separate flat plate for use in conjunction with the cable clamp forming, in effect, a two-part clamp. The purpose of the plate was to raise the non-metallic sheathed cable to a clamped position near the center of the round knockout opening. This construction had the disadvantage that additional parts were required for use in the cable box when used in conjunction with non-metallic sheathed cable. It meant a corresponding increase in cost of the fittings when the cable itself was of lower cost. Moreover, when the two-piece clamp was used, it was not possible to mount the cable through both the side and bottom walls of the box without changing the location of the clamp in the box. For this reason, it has been necessary for dealers to list non-metallic sheathed cable boxes in duplicate, one group being designed for side entrance of the cable and another group constructed for bottom entrance of the cable through appropriate changes in the location of the clamp. Thus, a dealer was required to stock both types with a consequent increase in cost.

I propose to overcome the aforementioned objection by providing a cable box for non-metallic sheathed cable in which the knockouts are so designed and located as to permit the cable to be inserted through either the side wall or bottom wall of the box, the box being provided with a one-piece cable clamp so constructed as to clamp the cable in either position. This makes it possible for the jobber to carry only a single box construction and clamp which is suitable for both side and bottom entrance of non-metallic sheathed cables the same as boxes provided for armored cable.

Therefore, it is an object of my invention to provide an improved cable box of the type described so constructed as to provide for both side and bottom entry of the non-metallic sheathed cable together with a two-way clamp for securing the cable in either position.

Another object of my invention is the provision of a cable box having knockouts designed for use with a one-piece clamp, the arrangement being such as to clamp the non-metallic sheathed cable firmly in position without damage to the cable.

A further object of my invention is the provision of a new and improved cable clamp adapted for use in an outlet box in conjunction with non-metallic sheathed cable, the clamp being formed as a single piece and being adjustable and self-aligning in the box to accommodate various sizes of cable.

In the accompanying drawing, Fig. 1 is a plan view of a cable box, such as an outlet box, the box being provided with knockouts and a clamp constructed in accordance with my invention; Fig. 2 is a sectional view through the box showing cables clamped in position; Fig. 3 is an end view of the cable box showing the form of knockouts employed, and Fig. 4 is a perspective view of a cable clamp constructed in accordance with my invention.

Referring to the drawing, Figs. 1 to 3, inclusive, illustrate my invention applied to cable boxes of the type commonly known as outlet boxes. The walls of such boxes are customarily provided with knockouts for receiving the ends of electric conductors, for example, non-metallic sheathed cable, the ends of the cables being secured within the box by cable clamping means.

To this end, the cable box 1 is provided with knockouts 2 in its side walls for receiving a non-metallic sheathed cable 3. Similar knockouts are formed in the bottom wall. The cable is held in position by a clamp 4 secured to the wall of the cable box by means of a screw 5.

According to my invention, the knockouts are so shaped and positioned as to receive a non-metallic sheathed cable without the necessity of employing a separate flat plate for cooperation with the clamp as in the construction now on the market. To this end, the knockouts 2, which are of generally circular form, are provided with a straight flat edge 6 over a portion of their periphery, as shown most clearly by Fig. 3. The edge 6 is formed immediately adjacent the bottom wall 8 of the cable box so that when the knockout is pried out of the side wall of the box, a flat bearing surface is formed in substantially the same plane with the bottom of the box to receive the end of the cable. The edge 6 is of a width corresponding to that of a two conductor cable. This box is thus constructed so that when a non-metallic sheathed cable is inserted into the outlet box, as shown in the right hand portion of Figs. 1 and 2, it rests flat against the bottom wall 8 of the box and is held securely in position by means of the clamping member 4. Since the edge 6 of the knockout is substantially flush with the bottom of the box, there is no sharp edge to cut or damage the outer sheath of the cable; the cable is held securely in position by clamp 4 and frictionally engages the bottom wall of the box.

As already mentioned, one of the advantages of my knockout construction is that it does not require a separate clamping plate mounted in the bottom of the box for use with non-metallic sheathed cables. Since the separate clamping plate takes up space within the box, my construction provides an additional amount of space available for wiring the cable and for the reception of the various wiring devices customarily mounted on the box. In addition, the number of clamping parts in the cable box has been reduced thereby effecting a saving in the cost of assembling the clamps within the box and in the number of parts required.

As shown in Figs. 2 and 3, the cable box is constructed with the knockouts 2 formed in both the side and bottom walls of the box. The knockouts are formed immediately adjacent each other with the flat edges 6 located at the intersection of the side and bottom walls of the box. This means that the cable may be inserted into the box through either the side or bottom wall, depending upon which knockout is removed. The clamp 4 is constructed to clamp the cable in either position. The screw 5 is threaded into a bushing 9 located at the intersection of the side and bottom walls of the box.

The clamp 4 is of a new and improved construction and is particularly designed for use with non-metallic sheathed cable in a box in which the knockouts are located in both the side and bottom walls. Referring now to Fig. 4, the clamp is provided with substantially flat sides 10 and 11 which extend at an angle to each other to form, in effect, a V-shaped member. The side walls join at the common point 12 which may be designated as the apex of the angle member. For a reason to be described later, the two sides 10 and 11 form an angle to each other which is less than 90°, this 90° angle being designated at A in Fig. 4. In order to accommodate the cable, the clamp is provided with spaced recesses 13. These recesses are deepest at the apex of the angle between the side plates and taper and extend backwardly into the side plates 10 and 11. To mount the clamp on the screw 5, a web 14 spans the space between the side walls 10 and 11 and is formed with an elongated slot 15 to accommodate the screw 5. In order to provide a gripping surface for engaging the outer sheath of the cable, the side walls are provided with projections 16 which are located in the walls of the recesses 13 so that when the clamp is mounted in position, the projections will frictionally engage the cable.

As shown in Fig. 2, when mounted in position, the clamp is adapted to cooperate with either the side wall or bottom wall knockouts to clamp a cable in position. The slot 15 gives the clamp a certain amount of play or freedom of movement on the screw 5. When a cable is inserted through a knockout opening, the cable end engages the tapered wall of the recess 13 so that the clamp is automatically tilted and shifted in position on the screw to permit the cable to enter the box. The construction makes it unnecessary to provide a spring on the screw to keep the clamp spaced from the box wall to facilitate insertion of the cable.

After the cable end is mounted in position beneath the clamp, the screw 5 is tightened down to move the clamp against the cable. The cable rests in the corresponding recess 13 and is frictionally held between the side wall of the recess and the wall of the box. The other side wall of the clamp is thus in position to cover the unused portion of the knockout opening through which the cable extends. This is true no matter which knockout is used. By making the angle between the clamp side walls less than 90°, the clamp may easily pivot about the screw and provide room for insertion of the cable. The angle between the side walls is such that when a cable engages one recess wall of the clamp, the other wall lies flush against the box wall to cover the knockout opening. From another viewpoint, it should be noted that the angle between the wall of any one recess 13 and the opposite side wall of the clamp is approximately 90 degrees, this 90 degree angle being indicated at B in Figs. 2 and 4. This means that when clamping a cable inserted through the side knockout, the wall of the recess 13 lies in a horizontal plane in engagement with the cable sheath whereas the other side wall of the clamp will lie in a vertical plane closing the knockout opening.

The clamp 4 is stamped from sheet metal and thus may be manufactured at low cost. It is easily and quickly assembled in the box by means of the screw 5.

What I claim as new and desire to secure by Letters Patent of the United States, is:

1. An electric cable box having side and bottom walls with knockout openings adjacent the intersection thereof, a screw mounted in the box at the intersection and a clamping member loosely mounted on said screw, said clamping member having substantially flat walls extending at an angle to each other, said clamping member being movable to permit a cable to be inserted through either of said knockout openings so that one of the clamp walls engages and clamps the cable against the surface of the corresponding wall of the box upon tightening of the screw.

2. An electric cable box having side and bottom walls with knockout openings adjacent the intersection of said walls, a screw mounted on the box at the intersection of said walls, and a clamping member loosely mounted on said screw, said clamping member having substantially flat walls extending at an angle of less than 90° to each other, said clamping member being movable on said screw to permit a cable to be inserted through either of said knockout openings so that one of the clamp walls engages and clamps the cable against the corresponding side wall of the box upon tightening of the screw, the other clamp wall covering the unused portion of the knockout opening through which the cable extends.

3. An electric cable box having side and bottom walls with knockout openings adjacent the intersection of said walls, a screw mounted on the box at the intersection of said walls, and a clamping member loosely mounted on said screw, said clamping member having substantially flat walls extending at an angle of less than 90° to each other, the clamping member being provided with at least one recess having its maximum depth at the apex of the angle and tapering into the angularly disposed walls, said clamping member being movable on said screw to permit a cable to be inserted through either of said knockout openings, the cable resting in the recess and the clamp wall serving to clamp the cable against the corresponding side wall of the box upon tightening of the screw.

4. An electric cable box having side and bottom walls formed with knockouts adjacent the intersection of said walls, those portions of the peripheries of the knockouts adjacent the intersection having flat edges substantially flush with the surfaces of the corresponding walls, a screw mounted on the box at the intersection of said walls, and a clamping member loosely mounted on said screw, said clamping member having walls extending at an angle of less than 90° to each other, the clamping member being provided with a recess having its maximum depth at the apex of the angle and tapering into the angularly disposed walls, said clamping member being moveable on said screw to permit a cable to be inserted through an opening formed by removal of one of the knockouts, the cable resting in the recess in the clamp and being held by the clamp against the corresponding side wall of the box upon tightening of the screw.

5. An electric cable box having side and bottom walls formed with knockouts adjacent the intersection of said walls, those portions of the knockouts adjacent the intersection having flat edges substantially flush with the surfaces of the corresponding walls, a screw mounted on the box at the intersection of said walls, and a clamping member provided with a slot for loosely mounting it on said screw, the said clamping member having walls extending at an angle of less than 90° to each other, the clamping member being provided with a recess for receiving the cable, said recess having its maximum depth at the apex of the angle and tapering into the angularly disposed walls, said clamping member being movable on said screw to permit a cable to be inserted through an opening formed by removal of one of the knockouts so that one of the clamp walls engages and clamps the cable against the corresponding side wall of the box upon tightening of the screw, the other clamp wall covering the unused portion of the knockout opening through which the cable extends.

6. An electric cable box having side and bottom walls formed with knockouts adjacent the intersection of said walls, those portions of the knockouts adjacent the intersection having flat edges substantially flush with the surfaces of the corresponding walls, a clamping member having walls extending at an angle to each other, a screw carried by said clamp, said screw being threaded into the box at the intersection of said walls, the clamping member being provided with a recess extending into both the angularly disposed walls, said clamping member being movable on said screw to permit a cable to be inserted through an opening formed by removal of any one of the knockouts so that one of the clamp walls engages and clamps the cable against the corresponding side wall of the box upon tightening of the screw with the cable resting in the recess, the other clamp wall covering the unused portion of the knockout opening through which the cable extends.

7. A cable clamp for use in a cable box having side and bottom walls formed with knockouts adjacent the intersection of said walls comprising a member having side walls extending at an angle of less than 90 degrees to each other, the member being provided with spaced recesses extending from the apex of the angle into both walls for receiving a cable, said member being provided with an opening between the recesses for receiving a screw to mount the clamp on the cable box.

8. A cable clamp for use in a cable box having side and bottom walls formed with knockouts adjacent the intersection of said walls comprising a member having side walls extending at an angle of less than 90° to each other, the member being provided with spaced recesses extending from the apex of the angle into both walls for receiving and clamping a cable, said member being provided with a web extending between the side walls, said web being located between the recesses and being provided with a slot for receiving a screw to mount the clamp on the cable box, the clamp being adjustable on the screw to clamp a cable extending through an opening formed by the removal of any one of the knockouts.

9. A cable clamp for use in a cable box having side and bottom walls formed with knockouts adjacent the intersection of said walls comprising a member having flat side walls extending at an angle of less than 90° to each other, the member being provided with at least one recess extending from the apex of the angle into both walls for receiving a cable, the recess in each wall having a cable engaging surface, the cable engaging surface of the recess in one wall being disposed at an angle of substantially 90° to the opposite wall of the member.

10. A cable clamp for use in a cable box having side and bottom walls formed with knockouts adjacent the intersection of said walls, comprising a member having flat side walls extending at an angle of less than 90° to each other, one wall of the member being provided with a recess having a cable engaging surface disposed at an angle of substantially 90° to the opposite wall of the member whereby a cable inserted through a knockout opening may be clamped between said surface and the cable box wall, with the said opposite wall of the member covering the knockout opening.

GEORGE CARLSON.

REFERENCES CITED

The following references are of record in the file of this patent:

UNITED STATES PATENTS

| Number | Name | Date |
| --- | --- | --- |
| 1,778,624 | Carlson | Oct. 14, 1930 |
| 1,809,840 | Fullman | June 16, 1931 |
| 2,051,129 | Clayton | Aug. 18, 1936 |
| 2,275,841 | Chuck | Mar. 10, 1942 |
| 2,378,529 | Austin | June 19, 1945 |